(12) United States Patent
Kumar et al.

(10) Patent No.: US 7,616,618 B2
(45) Date of Patent: Nov. 10, 2009

(54) CODE CYCLE MODULATION IN OPTICAL CODE DIVISION MULTIPLE ACCESS SYSTEMS

(75) Inventors: P. Vijay Kumar, Rolling Hills Estates, CA (US); Reza Omrani, Los Angeles, CA (US); Joseph D. Touch, Manhattan Beach, CA (US); Alan E. Willner, Los Angeles, CA (US); Poorya Saghari, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 560 days.

(21) Appl. No.: 11/289,259

(22) Filed: Nov. 29, 2005

(65) Prior Publication Data

US 2006/0209739 A1    Sep. 21, 2006

Related U.S. Application Data

(60) Provisional application No. 60/631,685, filed on Nov. 30, 2004.

(51) Int. Cl.
*H04B 7/216* (2006.01)
(52) U.S. Cl. .................. 370/342; 385/2; 385/3; 359/10; 359/11
(58) Field of Classification Search .............. 375/132; 370/335, 342, 320, 321, 324, 326; 385/1–3; 359/10, 11
See application file for complete search history.

(56) References Cited

U.S. PATENT DOCUMENTS

2006/0120434 A1* 6/2006 Fathallah et al. ............ 375/132

OTHER PUBLICATIONS

Kumar, P.V. et al. Coding Group Contribution to 18-Month Milestone. PowerPoint presentation made to SPAWAR monitor at USC, Apr. 26, 2004.

Kumar, P.V. et al. Secure Communication Over LANs Using Optical CDMA Technology: A Unified Novel Architecture / Coding / System / Device Approach. PowerPoint presentation made at USC to DARPA Grant Director, May 14, 2004.

Kumar, P.V. et al. Three-Fold Increase in Number of Active Users in an O-CDMA System Using Novel Code-Cycle Modulation. Made ready for a conference, Sep. 15, 2004. Copyright 2005 Optical Society of America. 3 pages.

* cited by examiner

*Primary Examiner*—Temica M Beamer
(74) *Attorney, Agent, or Firm*—McDermott Will & Emery LLP

(57) ABSTRACT

An optical code division multiple access (OCDMA) system includes an optical transmitter system configured to transmit data from a plurality of users through a shared optical channel by encoding the data from each user with a spreading code assigned to that user. Each spreading code includes a unique sequence of T time chips along a time axis. The data from each user is representable by T symbols. The OCDMA system further includes an optical receiver system configured to demodulate the data from each user by correlating signals received from the transmitter system with the spreading code assigned to that user. When transmitting a data symbol for each user, the transmitter system selects one out of T distinct cyclic shifts of the spreading code assigned to that user, and transmits the selected cyclic shift of the assigned spreading code along the time axis.

21 Claims, 7 Drawing Sheets

CODE CYCLE MODULATION IN OPTICAL CODE DIVISION MULTIPLE ACCESS SYSTEMS

CROSS REFERENCE TO RELATED APPLICATIONS

This application claims the benefit of priority under 35 U.S.C. § 119(e) from co-pending, commonly owned U.S. provisional patent application, Ser. No. 60/631,685, filed on Nov. 30, 2004, entitled "Code Cycle Modulation: Concept and Implementation." The entire content of this provisional application is incorporated herein by reference.

STATEMENT REGARDING FEDERALLY SPONSORED RESEARCH

This invention was made with government support under Contract No. N66001-02-8939 awarded by the Space and Naval Warfare Systems Command. The government has certain rights in the invention.

BACKGROUND

Optical code division multiple access (OCDMA) systems allow multiple users to simultaneously share an optical medium, thus significantly increasing the transmission capacity of optical fibers. The attributes of OCDMA networks include multiple asynchronous access by independent users, enhanced security, and soft response to subscriber number increase.

There has been renewed interest in optical code-division-multiple-access (OCDMA) systems due to their potential for enhanced data privacy as well as for plug-and-play operation. One drawback of OCDMA, however, may be that for the kinds of data rates demanded by current practical applications, and the number of users desired to be supported, conventional 1-D OCDMA systems may require an excessively high chip rate.

One approach towards partially alleviating the high chip rate requirement has been the introduction of two dimensional (2-D) OCDMA architectures, in which the quasi-orthogonal spreading codes of the different users are spread over both time and wavelength. The spreading codes used in OCDMA systems are commonly referred to as optical orthogonal codes (OOC), and have the property that each code can be distinguished from, and detected against, any circular shift of itself and/or any other code. Even under the time/wavelength approach with a reasonable number of wavelengths and practical chipping rates, however, OCDMA systems may still be unable to accommodate a sufficient number of active users.

For these reasons, there is a need for a method and system that allows a greater spectral efficiency to be achieved in OCDMA system, so that a higher number of users can be accommodated.

SUMMARY

An optical code division multiple access (OCDMA) system may include an optical transmitter system configured to transmit data from a plurality of users through a shared optical channel by encoding the data from each user with a spreading code assigned to that user. Each spreading code may include a unique sequence of T time chips along a time axis. The data from each user may be representable by T symbols. The OCDMA system may further include an optical receiver system configured to demodulate the data from each user by correlating signals received from the transmitter system with the spreading code assigned to that user. When transmitting a data symbol for each user, the transmitter system may be configured to select one out of T distinct cyclic shifts of the spreading code assigned to that user, and to transmit the selected cyclic shift of the assigned spreading code along the time axis.

A transmitter for an optical code division multiple access (OCDMA) system may be configured to transmit data from a plurality of users through a shared optical channel by encoding the data from each user with a spreading code assigned to that user. Each spreading code may include a unique sequence of T time chips along a time axis, the data from each user representable by T symbols. When transmitting a data symbol for each user, the transmitter may be configured to select one out of T distinct cyclic shifts of the spreading code assigned to that user, and to transmit the selected cyclic shift of the assigned spreading code along the time axis of the spreading code.

DETAILED DESCRIPTION

In the present disclosure, a code-cycle modulation (CCM) scheme for OCDMA systems is described. Under CCM, a transmitter selects and transmits a particular cyclic or wrap-around shift of the OOC spreading code that is assigned to the user whose data is being transmitting, using the phase of the spreading code to transmit information. The relative spectral efficiency of CCM permits a significantly increased number of users to be supported by OCDMA systems. For example, when the data are spread using 16 wavelengths and T=64 time chips per data symbol, CCM may permit the number of users supported to be increased more than threefold, in comparison with OOK (On-Off Keying).

Figure 1:
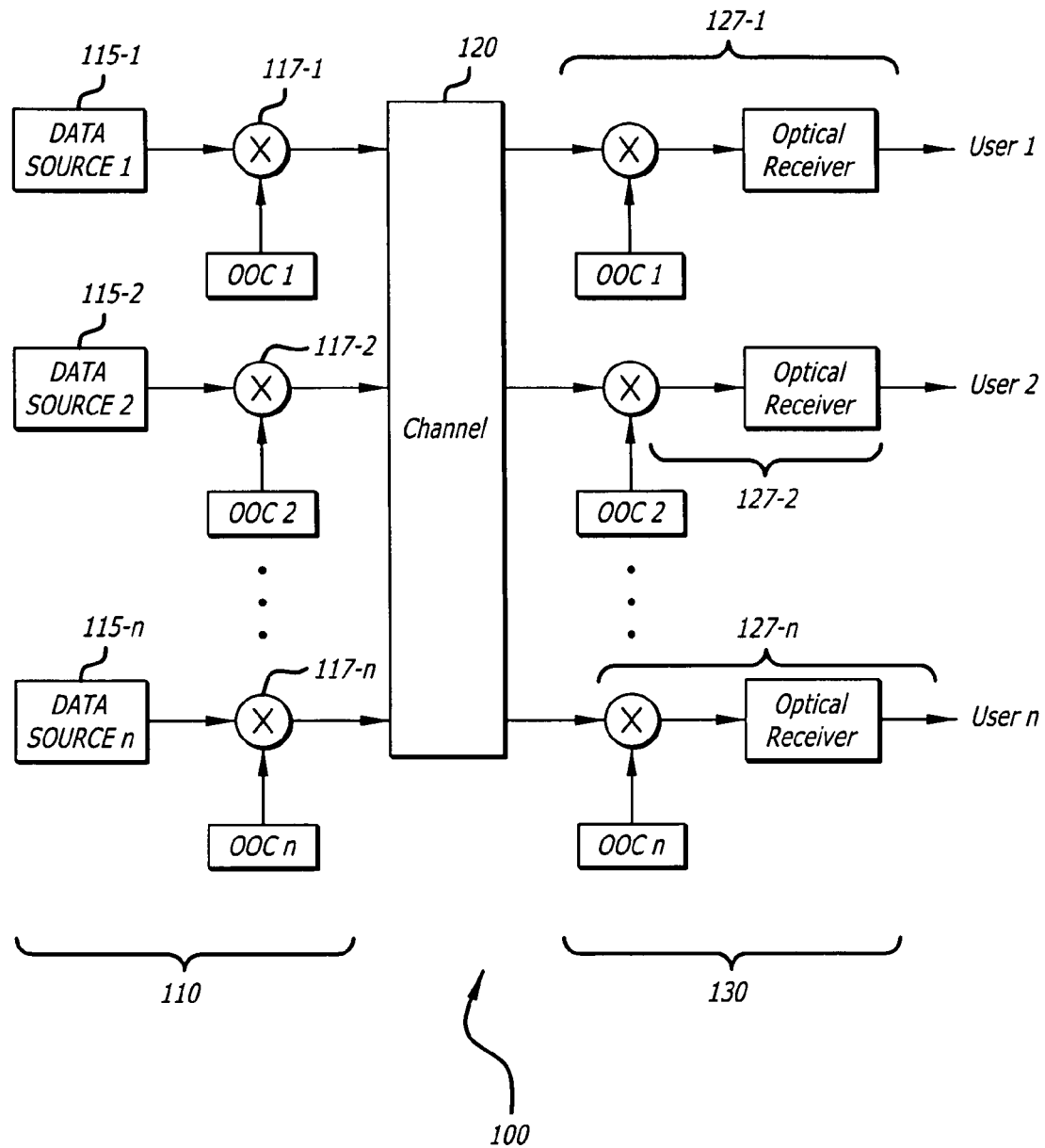
FIG. 1 illustrates one example of an asynchronous, non-coherent OCDMA system.

FIG. 1 schematically illustrates one example of an asynchronous, non-coherent OCDMA system 100. In overview, the OCDMA system 100 includes an OCDMA transmitting system 110, an OCDMA receiving system 130, and a shared optical channel 120. As seen in FIG. 1, the OCDMA system 100 may allow a plurality n of different users 115-1, 115-2, ..., 115-n to transmit their data on the same shared optical channel 120, by spreading each user's data by a unique spreading code or sequence assigned to that user. The different users are independent from each other, i.e. transmit data independently and may physically be apart from each other. In the OCDMA system 100 shown in FIG. 1, the transmitting system 110 includes a plurality n of transmitters 117-1, 117-2, . . . , 117-n, and a plurality n of matching receivers 127-1, 127-2, . . . , 127-n. In this type of OCDMA system, each receiver independently receives signals from its matching transmitter. Also, each receiver establishes synchronization with its matching transmitter using the spreading sequence, while different pairs of receivers and transmitters remain asynchronous with respect to each other. Different OCDMA systems may use different configurations for the receiving system and the transmitting system. For example, more than one user may share a receiver or a transmitter.

Each transmitter 117-i(i=1, . . . , n) may be configured to transmit data from the i-the user 115-i, and may include an encoder configured to encode the data from the i-the user with the spreading sequence assigned to the i-th user. In a traditional OCDMA system, such as the OCDMA system 100 shown in FIG. 1, these sequences may be unipolar {0,1} sequences called optical orthogonal codes (OOC). Each transmitter may be configured to encode the data from each user by encoding an optical carrier signal with the spreading code assigned to that user, then modulating the intensity of the encoded carrier signal in accordance with the data from that user. The OCDMA system 100 may include a broadband light source (not shown) configured to generate the optical carrier signal. The broadband light source may be a pulsed laser, for example. The transmitter system 110 may then combine on the shared channel 120 the encoded modulated signals for all the users 115-1, . . . , 115-n, generating an aggregate or multiplexed signal that combines the data from all the users and that is transmitted through the shared optical channel 120.

The receiving system 130 receives the multiplexed signal that combines all the users' data on the channel 120. Each transmitter-receiver pair 117-i and 127-i may be configured to retrieve the data from the i-th user (transmitted by the transmitter 117-i), by correlating the received signal from the transmitter system 110 with the specific transmitter 117-i's spreading sequence, then detecting the transmitting data using an optical receiver.

OOCs that are used as a spreading sequence in an OCDMA system may fall under two categories: 1) 1-D OOCs, and 2) 2-D OOCs. When 1-D OOCs are used, each OOC sequence may be a {0, 1} sequence in a single wavelength, and the spreading may be done only in time. When 2-D OOCs are used, the signal may be spread in both time and wavelength. In this approach, the spreading sequence may be an array of {0, 1} entries in both time and wavelength. A 2-D OOC which spreads a signal over L different wavelengths and T time slots, and which transmit ω optical pulses per code may be represented by the notation (L×T, ω, κ), where κ may be a maximum collision parameter (MCP). The MCP may be the maximum number of hits of any 2-D array in the OOC with any circular shift of itself or any other array of the same OOC. The remaining description in the present disclosure will focus on OCDMA systems which use 2-D OOC-type spreading codes, i.e. which assign to each user a unique spreading code matrix. It should of course be understood that the methods and systems described below are also applicable to OCDMA systems that use 1-D OOCs as spreading codes.

The spreading in the time domain may involve dividing a data element or bit into T time slots, commonly referred to as chips. By sending a short optical pulse during some chip intervals, but not others, an optical signature sequence (i.e. an optical spreading code) may be created, each user in the OCDMA system having a unique signature sequence. In other words, each data element may be represented in the time domain by a sequence or pattern of lit and unlit chips.

In an asynchronous OCDMA system, each spreading sequence within an OOC may satisfy the following two conditions: 1) the spreading sequence should be distinguishable from any cyclic shift of itself, i.e. should have a good auto-correlation property so that a transmitter—receiver pair can establish synchronization between themselves; and 2) the spreading sequence should be distinguishable from any cyclic shift of any other sequence for any other user, i.e. have a good cross-correlation property.

In a typical OCDMA system, there may be two separate phases in the operation of the receiver in a receiver-transmitter pair: an acquisition period, and a tracking period. During the acquisition period, the receiver may try to synchronize itself with the transmitter. In this mode, the receiver may take advantage of the good autocorrelation property of the spreading sequence. Different algorithms may be used for code acquisition by the receiver during this period. At the end of acquisition period the receiver and transmitter are synchronized.

During the tracking mode, the receiver and transmitter are synchronized and the receiver is receiving data from transmitter. In a classical OCDMA system that uses OOK (On-Off Keying) type modulation, each user transmits the spreading sequence to transmit 1, and transmit nothing to transmit 0. In the tracking mode, the receiver takes advantage of the good cross-correlation property of the spreading sequences. In the tracking mode, while each pair of receiver and transmitter are synchronous, the OCDMA system as a whole remains asynchronous during the tracking mode.

Figure 3A:
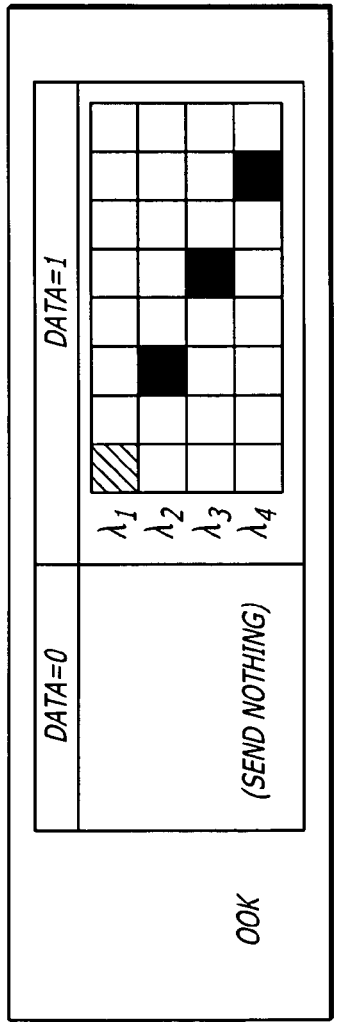
FIG. 3A illustrates data transmission in an OCDMA system that uses OOK (On-Off Keying) modulation.

FIG. 3A illustrates data transmission, in an OCDMA system that uses classical OOK (On-Off Keying) modulation. When OOK modulation is used, the encoder of each transmitter may represent the bit "1" of a user by sending the signature spreading sequence of that user, while the bit "0" of the user may not be encoded, as shown in FIG. 3A. In other words, the bit "0" may be represented by a sequence in which no optical pulse is sent during any chip.

One drawback of OCDMA systems that use OOK modulation is their very low spectral efficiency. The code cycle modulation (CCM) scheme disclosed in the present application may significantly increase the spectral efficiency of the OCDMA system.

Figure 2:
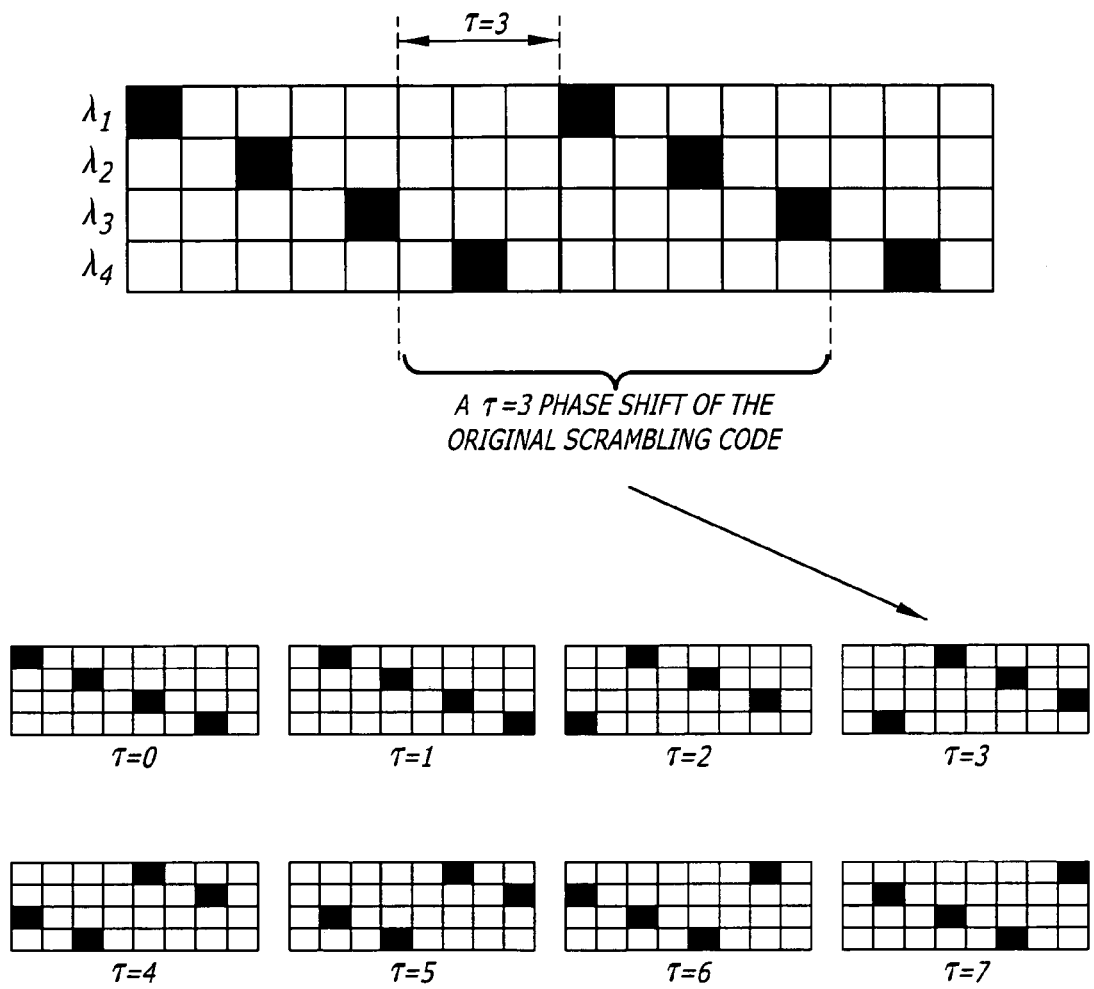
FIG. 2 illustrates the use of code cycle modulation (CCM) to generate T data symbols from a single spreading sequence that has T time chips.
Figure 3B:
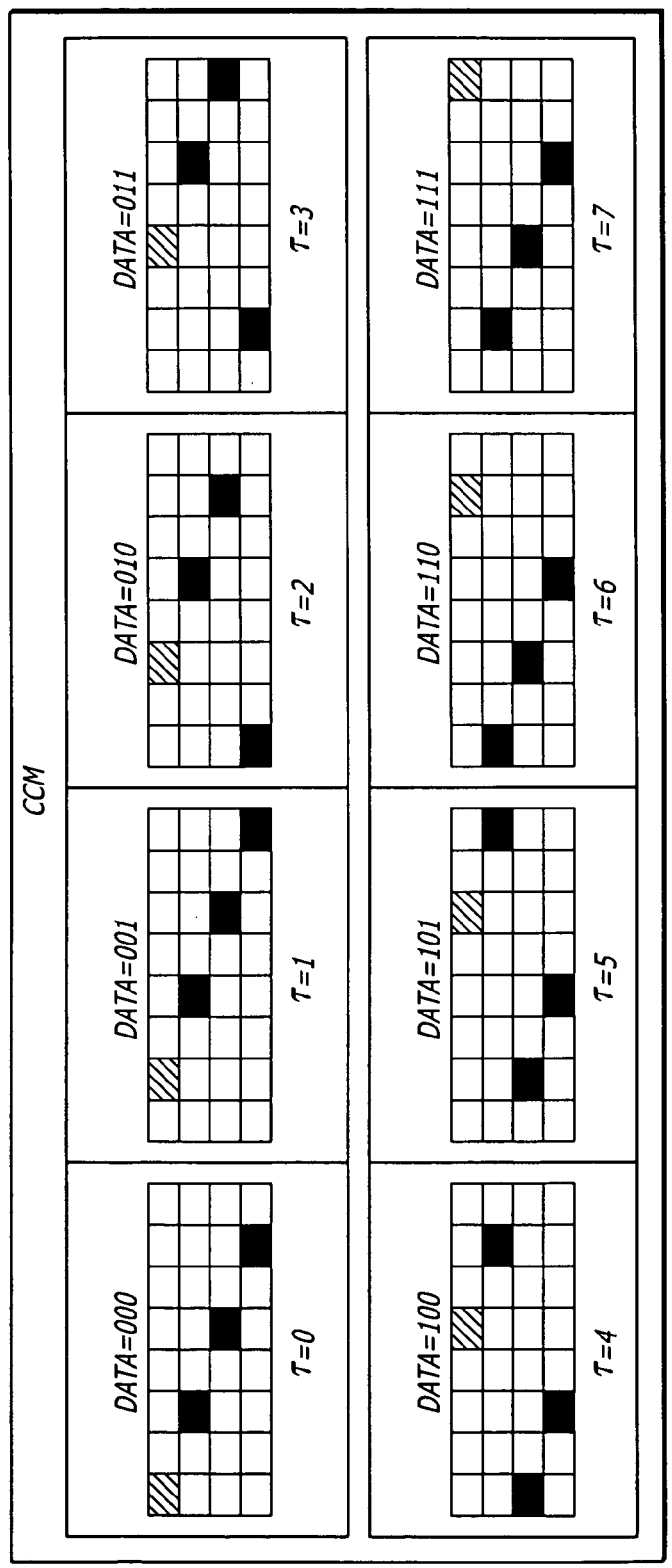
FIG. 3B illustrates data transmission in one embodiment of an OCDMA system that uses CCM (code cycle modulation).

FIGS. 2 and 3B illustrate the use of code cycle modulation (CCM) for data transmission in OCDMA systems. CCM takes advantage of the fact that in the post-acquisition phase (i.e. in the tracking mode during which the receiver receives data from the transmitter), a synchronous link exists between transmitter and receiver, and that once synchronization is established between the receiver in a receiver-transmitter pair, the receiver is able to decode any cyclic shift of the spreading sequence that may be sent to the receiver. As mentioned earlier, in the tracking mode the transmitter and receiver have been synchronized, while the whole system is asynchronous. Each spread sequence is distinct from all of its cyclic shifts, and it is necessary to maintain the synchronization between the receiver and transmitter. Once the synchronization is established, however, there is no need to transmit synchronization data which is hidden in each sequence. Since each cyclic shift of the spreading code is distinguishable from any other cyclic shift of the spreading code, the phase of the spreading code can be used to convey data. In this way, data may be transmitted at dramatically higher data rates, using the CCM scheme When the spreading sequences have a length T along the time axis, i.e. has a total number T of time chips, the data from each user may be represented by a number T of data symbols.

The number of data symbols is thus equal to the length T of the spreading code in the time domain. Each of the T time chips in the spreading code may have a chip interval $T_c$, so that each of the T symbols is transmitted during a transmission interval or symbol time $T_b=T \times T_c$.

FIG. 2 show an example of how to generate all T data symbols from a single spreading sequence, in a CCM modulation. In overview, in a CCM modulation scheme, the transmitter system selects, when transmitting a particular data symbol for a user, one out of a plurality T of distinct cyclic shifts of the spreading code assigned to that user, and sends the selected cyclic shift of the assigned spreading code along the time axis. The selected cyclic shift for the i-th data symbol (i=0, 1, . . . , T−1) is generated by cyclically shifting the original unshifted spreading sequence, by i chip intervals along the time axis.

Using the fact that each and every one of the T cyclic shifts of an OOC spreading sequence are distinct from each other, CCM implement ($\log_2$ T)-ary signaling (instead of the binary signaling used in traditional OOK). In this ($\log_2$ T)-ary signaling scheme, each one of the cyclic shifts of the spread sequence represents a respective one of the T data symbols. As seen in FIG. 3B, each of the different CCM data symbols are labeled with the different T, $\log_2$ T bits {0,1} sequences, and the T data symbols may be used to transmit data. Each of the T cyclic shifts ($\tau$=0, 1, 2, . . . T−1) of the spread sequence represents a corresponding one of the T data symbols.

In CCM the message alphabet has a size equal to the spreading code length T, and each user is assigned a distinct code matrix. To send the ($\tau$+1)'th data symbol, therefore, the user's code matrix is cyclically shifted along the time axis by $\tau$ chip times, as shown in FIG. 2.

The CCM scheme shown in FIG. 3B may be compared with the OOK scheme shown in FIG. 3A. FIG. 3B shows that in CCM, $\log_2$ T bits are transmitted during transmission of each of the T data symbols. Instead of transmitting a single bit in each transmission while sending nothing for 0, and instead of sending a copy of the spreading sequence to transmit 1, as in the OOK scheme illustrated in FIG. 3A, in the CCM scheme shown in FIG. 3B, $\log_2$ T bits are transmitted during the transmission of each data symbol. In the embodiment illustrated in FIGS. 2 and 3B, T is =8, so that $\log_2 T=\log_2 8=3$ bits of information are transmitted during the transmission of each one of the T=8 symbols that represent the data from the user to whom the spreading sequence of length T has been assigned. As seen in FIG. 3B, in this embodiment the T=8 data symbols are the following:

(000), (001), (010), (011), (100), (101), (110), and (111).

Figure 4:
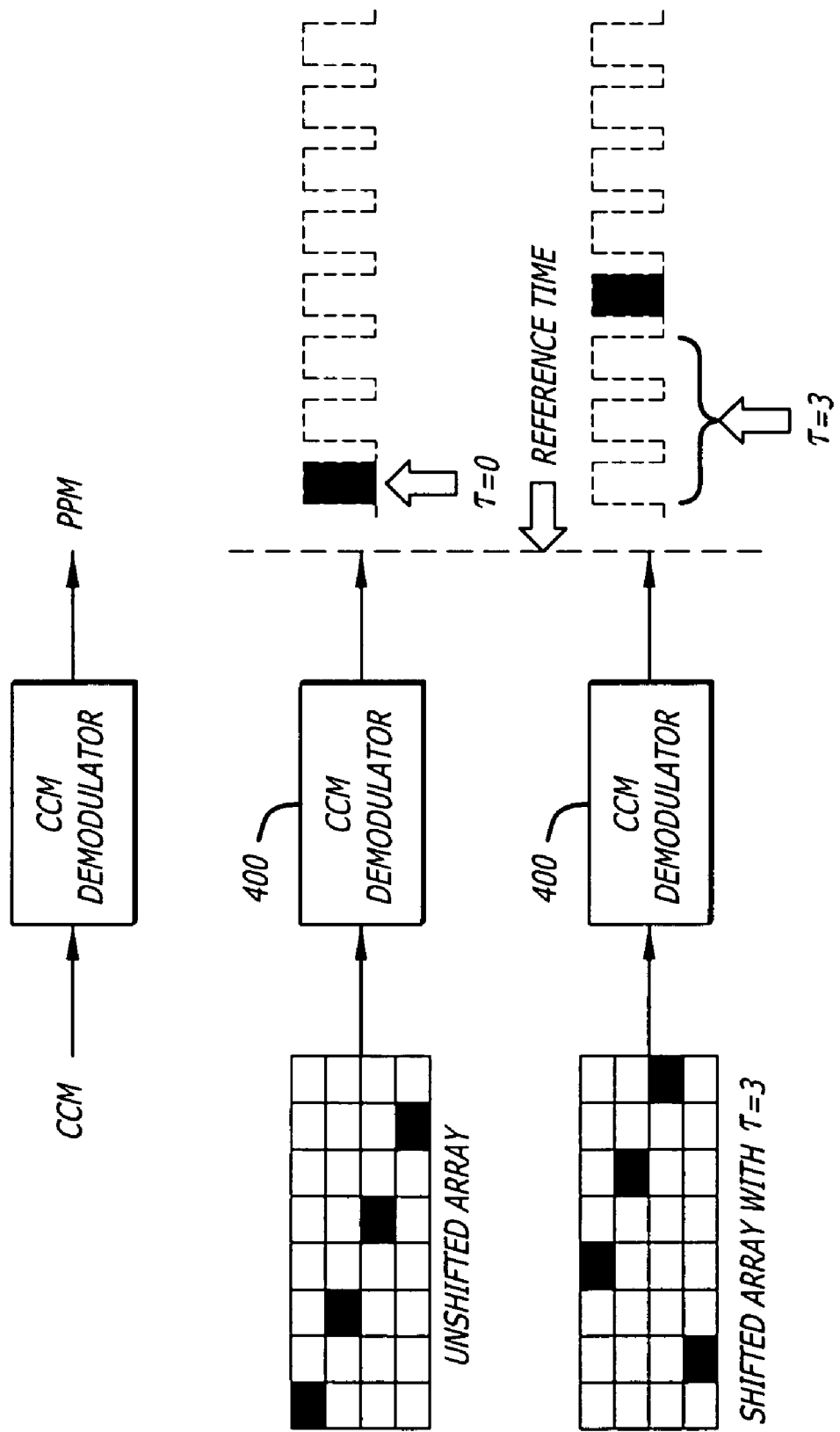
FIG. 4 is a block diagram of a CCM demodulator.

FIG. 4 is a block diagram of one embodiment of a CCM demodulator 400. Because in the CCM scheme the data is encoded in the amount $\tau$ of cyclic shifts of the spreading sequence, a CCM demodulator may have to be capable of detecting the amount $\tau$ of cyclic or circular shift of the received sequence, in comparison to the basic unshifted spreading sequence. As shown schematically in the block diagram of FIG. 4, in CCM a demodulation scheme may be used in which the CCM demodulator 400 is configured to generate an optical pulse at the output that has a time delay that precisely corresponds to the amount $\tau$ of the detected cyclic shift.

In a classical OOK system, at the receiver end, the pulses along the different wavelengths are delayed by the appropriate integer multiples of the chip delay $T_c$, that is needed to bring all the pulses into time alignment. If in place of the spreading code, the incoming spreading code is a cyclic shift of the spreading code, as is the case in the CCM scheme described above, then the presence of the cyclic shift may cause some of the pulses to be misaligned relative to others by T time slots. As a result, decoding one bit may take up to two bit-times ($2T_b$).

In order to accomplish the demodulation scheme described in conjunction with FIG. 4, the cyclically shifted or "wrapped around" pulses must be delayed for one symbol time $T_b$, in order to stack all the pulses on top of each other and then detect the amount $\tau$ of circular shift. In addition, since the detection takes more than one symbol time $T_b$, and may take up to two symbol times, the detection m ay not be done with a single receiver, and a dual receiver may be implemented, as described further below.

In one embodiment, a cycling or circulating optical shift register (COSR) may be used that is configured to memorize the arriving pulses within one bit time for duration of up to 2 bit times. The resultant two sets of pulses may be brought into alignment by feeding the pulses into the cycling optical shift register.

Figure 5:
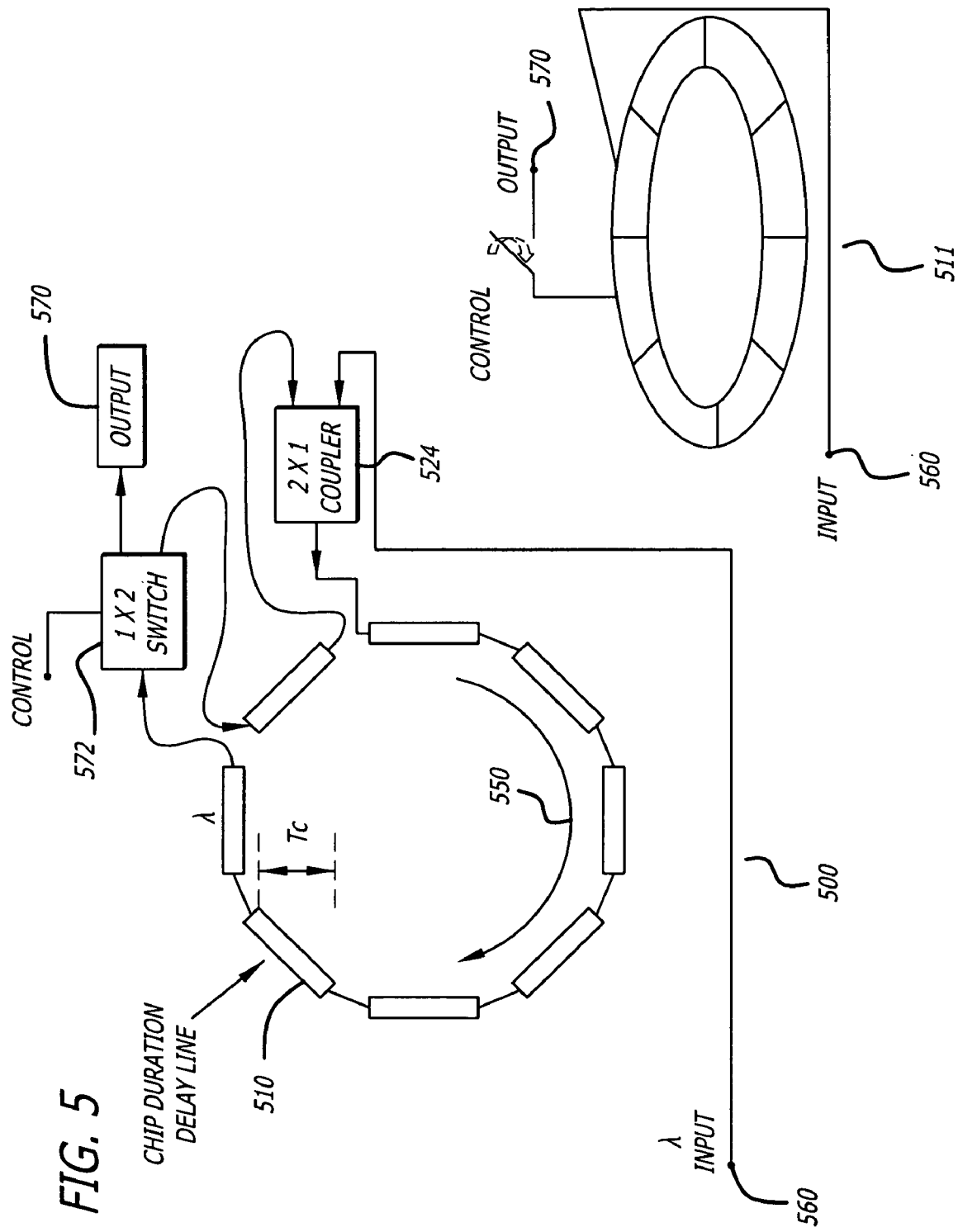
FIG. 5 illustrates one embodiment of a COSR (Cycling Optical Shift Register).

FIG. 5 illustrates one embodiment of a COSR (cycling optical shift register) 500, which may be used as a building block of the CCM demodulator 400 described in conjunction with FIG. 4, in order to implement the correct delay for the wrapped around pulses. In overview, the COSR 500 is configured to keep some pulses for more than one symbol time, and some other pulses for less than a symbol time. When operating at a wavelength $\lambda$, the COSR 500 is configured to keep the non-wrapped around pulses a necessary time $d_\lambda$ that is necessary to stack it with other pulses. The COSR 500 is further configured to keep the wrapped around pulse an additional symbol time $T_b$. In the embodiment illustrated in FIG. 5, the COSR 500 operates in a specific wavelength $\lambda$, and the input signal to the COSR 500 is in wavelength $\lambda$. In one embodiment (not illustrated), the COSR may be a reconfigurable COSR, which can vary its $d_\lambda$ from 0 to $(T-1)*T_c$, with steps of $T_c$.

As seen in FIG. 5, the COSR 500 includes T delay lines 510 in wavelength $\lambda$, where T is the number of time slots in the spreading sequence. Each delay line 510 has a chip interval of duration $T_c$. The COSR 500 further includes a 1×2 switch 522, and a 2×1 coupler 524. The switch 522 can switch between two operating modes of COSR: the loop mode, and the delay mode. In the loop mode, the switch 522 connects its input from the COSR 500 back to the COSR 500, thereby creating a loop 550. The entire delay for the input to go around the loop 550 to the output of the coupler is equal to one bit time $T_b$. In this way, the wrap around pulses are made to wait for one symbol time $T_b$, in order to be able to stack with other pulses. For convenience, the COSR 500 may be represented by a symbol that indicated in FIG. 5 using reference numeral number 511.

When the switch is connected to the output, COSR is working in delay mode, in which the entire delay from input to output is equal to $d_\lambda$. This delay is used to stack all the pulses on top of each other, and is determined by the number of delay lines from input to output.

In addition to COSR, another technique for implementing the above-described demodulation scheme is dual delay. Dual delay consists of a delay profile equivalent to $d_\lambda$s in COSR for different wavelengths, followed by two branches of delays in parallel. The power after the delays may be split into two branches. The output of the two branches may be coupled into the output of the dual delay segment. The delay on one of the branches is given by $T*T_c$, while the other branch has a negligible delay. With this configuration, during the first symbol time the output may be irrelevant, whereas during the second symbol time the stacked pulses may appear at a desired chip time. In this way, two dual delay segments allow the signal to be decoded properly. The above-described dual delay technique may be used for modulation, as well as for demodulation.

As described earlier, since detection with the COSR takes more than one symbol time $T_b$, and may take up to two symbol times, the detection may not be done with a single COSR receiver module, and a dual COSR receiver may be implemented that includes two COSR receiver modules.

Figure 6:
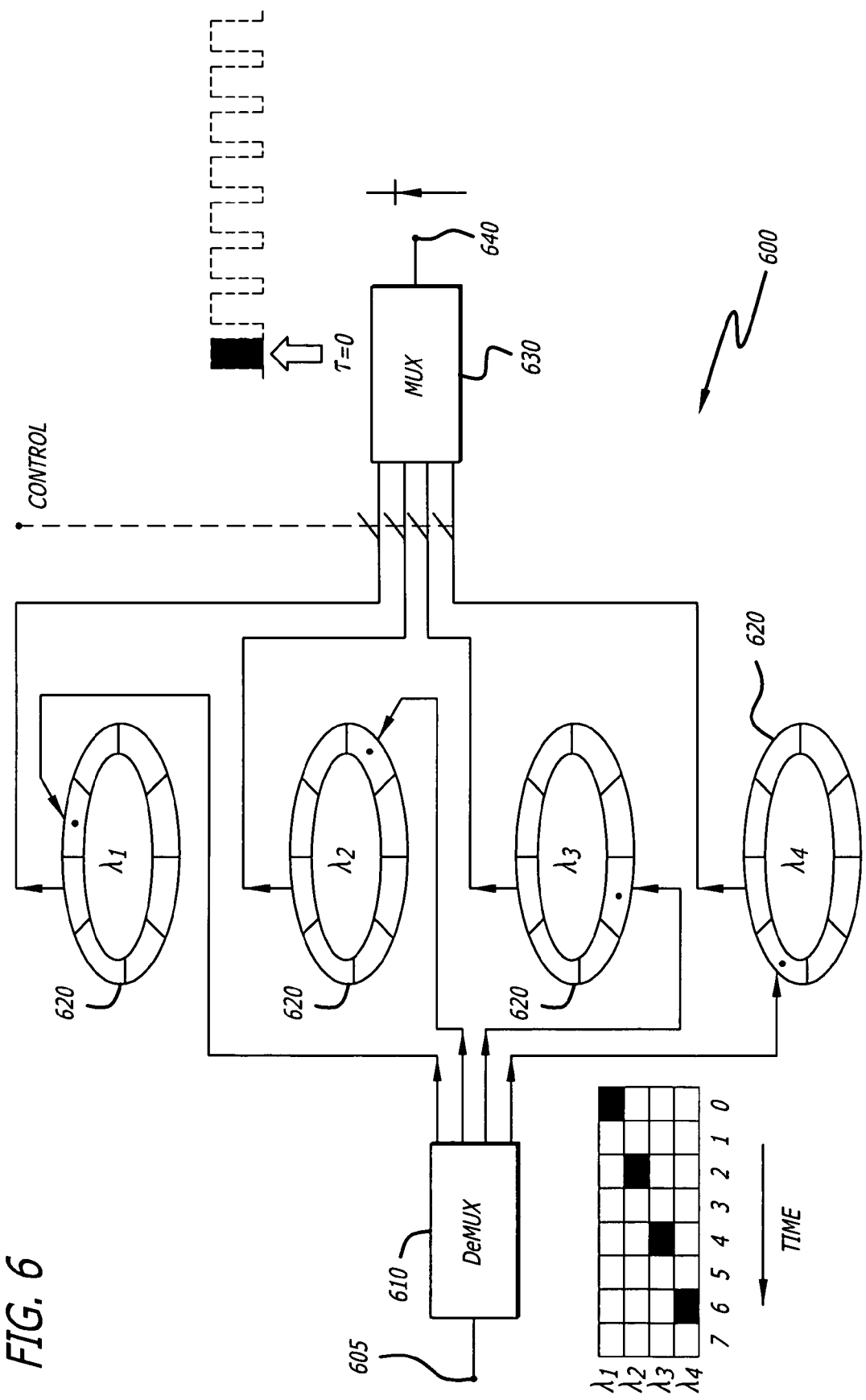
FIG. 6 illustrates one embodiment of a COSR receiver module.

FIG. 6 illustrates a single COSR receiver module 600. The COSR receiver module 600 includes: a demultiplexer 610 configured to separate the different wave-lengths coming into an input port 605 of the receiver module 600; a plurality of COSRs 620 that work in parallel; and a multiplexer 630 configured to couple different wavelengths into one output 640. The number of COSRs 620 is equal to the number of incoming wavelengths, and the delay between input and output of a CO SR that is working in wavelength λ is $d_λ$. $d_λ$ is equal to the delay needed in the wavelength channel λ to stack up all the pulses in a classical OOK-type OCDMA receiver.

The COSR receiver module 600 has two different phases: a buffering phase, and a detection phase. In the buffering phase, the input port 605 is connected to the input line, and all of the COSRs 620 are in loop mode. After T chip times $T_c$, all of the pulses are stacked on top of each other on a known segment of each of the COSRs. In the detection phase, after T chip intervals $T_c$ (T×$T_c$ being equal to one symbol time T$b$) the input port is disconnected from the input line, and the COSR goes into delay mode. At this point, if the stacked pulses are at the input of the switch 522, then they are forwarded to the output, which is equivalent to τ=0. If τ≠0 then the pulses are in some segment with distance τ$T_c$ from the output, and will arrive to the output after τ chip times. In this case, at the output a pulse is received with a delay relative to a reference clock which is proportional to τ. In this way, using the COSR receiver module 600, CCM is converted to PPM (Pulse Position Modulation).

A COSR transmitter module may have a structure similar to the COSR receiver module described above in conjunction with FIG. 6, the only difference being that for the transmitter module, the delay between the input and output of a COSR that is working in wavelength λ is equal to T−$d_λ$, rather than $d_λ$ as in the case of the receiver module. In a COSR transmitter module, the COSR is configured to convert a time shift of an optical pulse that appears at a desired chip interval into a cyclic shift of the spreading code matrix.

Figure 7:
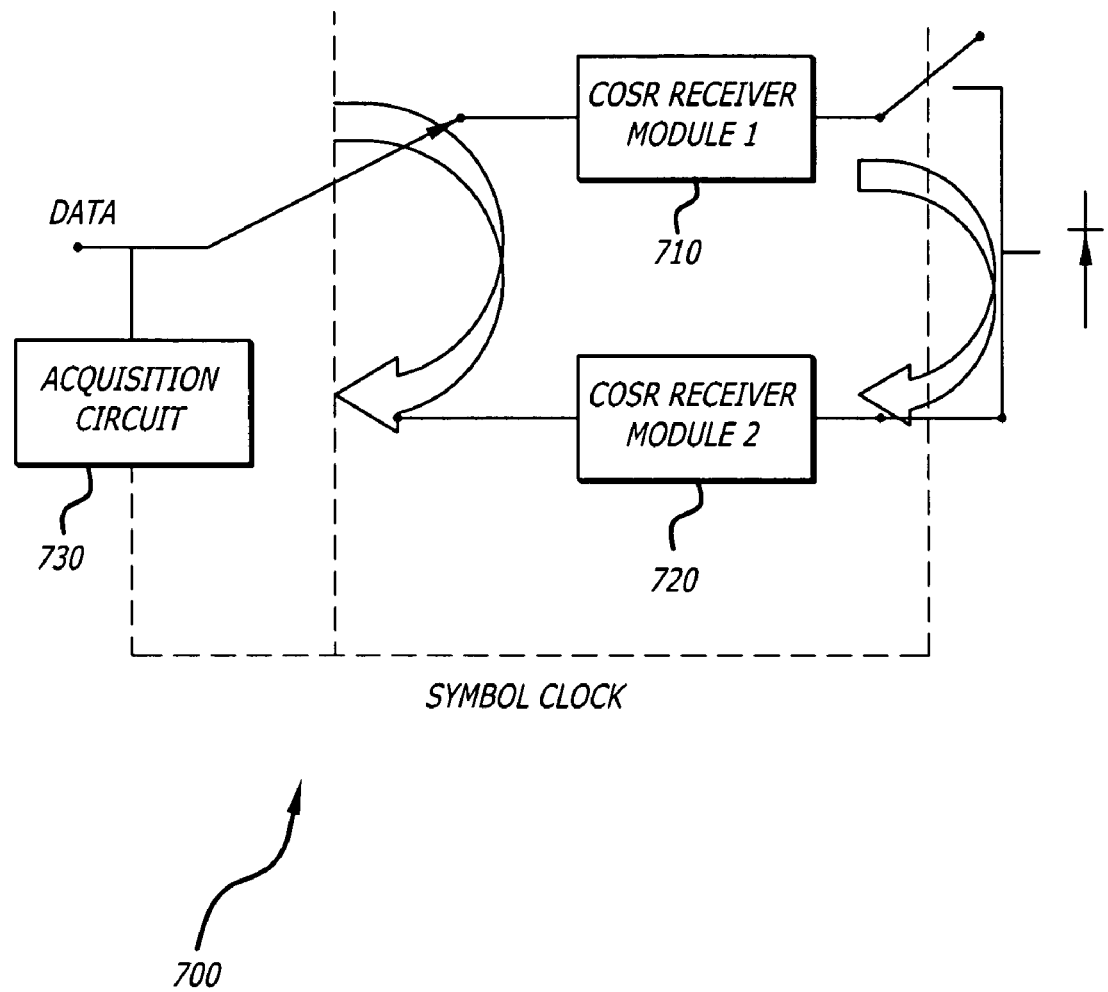
FIG. 7 schematically illustrates a dual COSR receiver.

FIG. 7 schematically illustrates a dual COSR receiver 700, which includes two COSR receiver modules 710 and 720, connected in parallel. The two modules 710 and 720 are arranged such that when one of the two modules is in the buffering phase, and is connected to the input, the other one is in the detection phase, and is connected to the output. In this way, all information can be retrieved with one symbol delay.

While certain embodiments have been described of a CCM system and method, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An optical code division multiple access (OCDMA) system, comprising:
    an optical transmitter system configured to transmit data from a plurality of users through a shared optical channel by encoding the data from each user with a spreading code assigned to that user, each spreading code including a unique sequence of T time chips along a time axis, the data from each user representable by T symbols; and
    an optical receiver system configured to demodulate the data from each user by correlating signals received from the transmitter system with the spreading code assigned to that user;
    wherein when transmitting a data symbol for each user, the transmitter system is configured to select one out of T distinct cyclic shifts of the spreading code assigned to that user, and to transmit the selected cyclic shift of the assigned spreading code along the time axis.

2. The OCDMA system of claim 1, wherein each of the T cyclic shifts of the spreading code assigned to each user is distinct from each other; and
    wherein each of the T cyclic shifts of the spreading code assigned to that user represents a corresponding one of the T symbols that represent the data from that user.

3. The OCDMA system of claim 2, wherein each of the T time chips in the spreading code has a chip interval $T_c$, so that each of the T symbols is transmitted during a transmission interval $T_b$=T×$T_c$.

4. The OCDMA system of claim 3, wherein the selected cyclic shift for the i-th data symbol (i=0, 1, . . . , T−1) is generated by cyclically shifting the spreading code along the time axis by i chip intervals.

5. The OCDMA system of claim 1, wherein each time chip in the sequence of T time chips comprises one of: a lit chip during which an optical pulse is transmitted, and an unlit chip during which no optical pulse is transmitted.

6. The OCDMA system of claim 3, wherein each spreading code is a 2-D matrix, and includes a sequence of T time chips along a time domain, and a sequence of L wavelengths along a wavelength domain.

7. An optical code division multiple access (OCDMA) system, comprising:
    an optical transmitter system configured to transmit data from a plurality of users through a shared optical channel by encoding the data from each user with a spreading code assigned to that user, each spreading code including a unique sequence of T time chips along a time axis, the data from each user representable by T symbols; and
    an optical receiver system configured to demodulate the data from each user by correlating signals received from the transmitter system with the spreading code assigned to that user;
    wherein when transmitting a data symbol for each user, the transmitter system is configured to select one out of T distinct cyclic shifts of the spreading code assigned to that user, and to transmit the selected cyclic shift of the assigned spreading code along the time axis;
    wherein the transmitter system is configured to transmit $\log_2 T$ bits of information when transmitting each of the data symbols during the transmission interval $T_b$.

8. The OCDMA system of claim 7, wherein L=4, and T=8;

wherein $\log_2 T=\log_2 8=3$ bits of information are transmitted during the transmission of each one of the T=8 symbols that represent the data from each user; and wherein the T=8 symbols comprise the following:

(000), (001), (010), (011), (100), (101), (110), and (111).

9. The OCDMA system of claim 1, wherein the transmitter system is further configured to encode the data from each user by encoding an optical carrier signal with the spreading code assigned to that user, then modulating the intensity of the encoded carrier signal in accordance with the data from that user; and wherein the transmitter system further configured to multiplex the encoded modulated signals for all the users to generate a multiplexed signal that combines the data from all the users and that is transmitted through the shared optical channel.

10. The OCDMA system of claim 9, further comprising a broadband light source configured to generate the optical carrier signal for each user.

11. The OCDMA system of claim 1, wherein the receiver system is further configured to establish a synchronous link with the transmitter system by code acquisition, prior to demodulating the data.

12. The OCDMA system of claim 1, wherein the transmission system is configured to transmit data from a plurality N of users, and comprises a plurality N of transmitters, each transmitter configured to encode and transmit data from a corresponding one of the N users;

wherein the receiver system includes a plurality N of receivers, each receiver coupled to an associated transmitter; and wherein each receiver is configured to decode the spreading code used by its associated transmitter to encode the data from its corresponding user.

13. The OCDMA system of claim 12, wherein each receiver is configured to establish synchronization with its associated transmitter during an acquisition period, and wherein each receiver is configured to receive data from its associated transmitter during a tracking period in which the synchronization has been achieved.

14. The OCDMA system of claim 6, wherein the receiver system comprises a demodulator that detects an amount of cyclic shift of each received spreading code, and converts the detected cyclic shift to a time shift of an optical pulse, to generate at an output of the demodulator an optical pulse that has a time shift corresponding to the detected cyclic shift.

15. The OCDMA system of claim 14, wherein the demodulator includes at least one COSR (Cycling Optical Shift Register), and wherein the COSR is configured to convert a cyclic shift of the spreading code matrix to a time shift of an optical pulse, thereby causing an optical pulse to appear at a desired chip interval.

16. The OCDMA system of claim 15, wherein the COSR comprises a number T of delay lines in wavelength λ, each delay line having a duration equal to the chip interval $T_c$, and wherein the COSR is configured to align each shifted pulse in each of the L wavelengths at an output of the COSR after T chip intervals $T_c$.

17. The OCDMA system of claim 16, wherein the receiver system comprises at least one COSR receiver module, the COSR receiver module comprising:

a demultiplexer configured to separate out the L different wavelengths λ;

a plurality L of COSRs that work in parallel; and a multiplexer configured to couple the L different wavelengths to a single output.

18. The OCDMA system of claim 17, wherein the COSR receiver module, when in a buffering phase, is configured to operate all of the plurality L of COSRs in the loop mode, so that after T chip intervals Tc, all the pulses are stacked on top of each other on a known segment of each of the COSRs; and wherein the COSR receiver module, when in a detection phase, is configured to send the plurality of COSRs in the delay mode, so that the pulses stacked on the known segment of the COSRs are delivered at an output of the COSR receiver module with a time delay corresponding to τ=0, and any pulse with nonzero τ that is at a distance τ× $T_c$ from the output is delivered at the output of the COSR receiver module with a delay that is proportional to the nonzero τ.

19. The OCDMA system of claim 18, wherein the receiver system comprises a dual COSR receiver, the dual COSR receiver comprising a first COSR receiver module and a second COSR receiver module coupled in parallel, the first and second COSR receiver modules constructed and arranged so that when one of the first and second modules is in the buffering phase and is connected to an input of the dual COSR receiver, the other one of the first and second modules is in the detection phase, and is connected to an output of the dual COSR receiver.

20. The OCDMA system of claim 6, wherein the transmitter system includes at least one COSR (Cycling Optical Shift Register), and wherein the COSR is configured to convert a time shift of an optical pulse that appears at a desired chip interval to a cyclic shift of the spreading code matrix.

21. A transmitter for an optical code division multiple access (OCDMA) system, the transmitter configured to transmit data from a plurality of users through a shared optical channel by encoding the data from each user with a spreading code assigned to that user, each spreading code including a unique sequence of T time chips along a time axis, the data from each user representable by T symbols;

wherein when transmitting a data symbol for each user, the transmitter is configured to select one out of T distinct cyclic shifts of the spreading code assigned to that user, and to transmit the selected cyclic shift of the assigned spreading code along the time axis of the spreading code.

* * * * *